United States Patent
Ramachandrula et al.

(10) Patent No.: US 9,160,885 B2
(45) Date of Patent: Oct. 13, 2015

(54) SKEW DETECTION

(75) Inventors: Sitaram Ramachandrula, Karnataka (IN); Serene Banerjee, Karnataka (IN); Pulkit Parikh, Karnataka (IN); Noushath Shaffi, Karnataka (IN); Anjaneyulu Seetha Rama Kuchibhotla, Karnataka (IN); Prasenjit Dey, Karnataka (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 544 days.

(21) Appl. No.: 13/382,097

(22) PCT Filed: Jul. 2, 2009

(86) PCT No.: PCT/IN2009/000373
§ 371 (c)(1),
(2), (4) Date: Jan. 3, 2012

(87) PCT Pub. No.: WO2011/001439
PCT Pub. Date: Jan. 6, 2011

(65) Prior Publication Data
US 2012/0106844 A1 May 3, 2012

(51) Int. Cl.
*G06K 9/32* (2006.01)
*H04N 1/387* (2006.01)
*G06K 9/46* (2006.01)

(52) U.S. Cl.
CPC ............ *H04N 1/3878* (2013.01); *G06K 9/3283* (2013.01); *G06K 9/4633* (2013.01); *G06K 9/4647* (2013.01); *G06K 2209/01* (2013.01)

(58) Field of Classification Search
CPC .... G06K 7/1456; G06K 9/3283; G06T 3/608; G06T 7/0085; H04N 1/3878; H04N 2201/0432
USPC .................................. 382/173, 176, 289–290
See application file for complete search history.

(56) References Cited

U.S. PATENT DOCUMENTS

| 4,314,159 A | 2/1982 | Davis |
| 4,533,959 A | 8/1985 | Sakurai |
| 4,837,635 A | 6/1989 | Santos |
| 4,866,784 A * | 9/1989 | Barski ............................ 382/289 |
| 4,912,559 A | 3/1990 | Ariyoshi et al. |
| 4,941,189 A | 7/1990 | Britt |
| 5,001,766 A | 3/1991 | Baird |

(Continued)

OTHER PUBLICATIONS

Chou et al. "Estimation of skew angles for scanned documents based on piecewise covering by parallelograms". vol. 40, No. 2: Pattern Recognition. Feb. 2007. pp. 443 to 455. Abstract; Paragraphs 1-2, 4; Figures 1-2; Description of figures.

(Continued)

*Primary Examiner* — Jingge Wu
(74) *Attorney, Agent, or Firm* — Mannava & Kang, P.C.

(57) ABSTRACT

Presented is a skew detection apparatus. In one form, the apparatus estimates skew based on the locations of a set of foreground content pixels or a set of edge pixels that are nearest to the side of an image of a document. In another form, the apparatus includes a skew estimation unit adapted to estimate skew based on the orientation of foreground or background content in the interior of a document. In another form, the apparatus estimates skew using segments of an image of a document. Also presented is a document image processing apparatus including the skew detection apparatus.

8 Claims, 17 Drawing Sheets

(56) References Cited

U.S. PATENT DOCUMENTS

| | | | |
|---|---|---|---|
| 5,093,653 | A | 3/1992 | Ikehira |
| 5,245,676 | A | 9/1993 | Spitz |
| 5,355,420 | A | 10/1994 | Bloomberg et al. |
| 5,491,760 | A * | 2/1996 | Withgott et al. ............ 382/203 |
| 5,506,918 | A * | 4/1996 | Ishitani ........................ 382/289 |
| 5,517,587 | A | 5/1996 | Baker et al. |
| 5,563,403 | A * | 10/1996 | Bessho et al. ............. 250/208.1 |
| 5,592,574 | A | 1/1997 | Chilton et al. |
| 5,687,253 | A * | 11/1997 | Huttenlocher et al. ....... 382/177 |
| 5,748,344 | A | 5/1998 | Rees |
| 5,767,978 | A | 6/1998 | Revankar et al. |
| 5,901,253 | A | 5/1999 | Tretter |
| 6,005,663 | A | 12/1999 | Son et al. |
| 6,034,784 | A | 3/2000 | Gatto et al. |
| 6,151,426 | A | 11/2000 | Lee et al. |
| 6,249,604 | B1 * | 6/2001 | Huttenlocher et al. ....... 382/174 |
| 6,263,122 | B1 | 7/2001 | Simske et al. |
| 6,288,797 | B1 | 9/2001 | Ueno |
| 6,304,684 | B1 | 10/2001 | Niczyporuk et al. |
| 6,310,984 | B2 | 10/2001 | Sansom-Wai et al. |
| 6,344,906 | B1 | 2/2002 | Gatto et al. |
| 6,360,026 | B1 | 3/2002 | Kulkarni et al. |
| 6,384,901 | B1 | 5/2002 | Johnson |
| 6,385,351 | B1 | 5/2002 | Simske et al. |
| 6,430,320 | B1 | 8/2002 | Jia et al. |
| 6,452,374 | B1 | 9/2002 | Kreischer |
| 6,459,509 | B1 | 10/2002 | Maciey et al. |
| 6,490,376 | B1 | 12/2002 | Au et al. |
| 6,674,901 | B1 | 1/2004 | Simske et al. |
| 6,683,984 | B1 | 1/2004 | Simske et al. |
| 6,771,842 | B1 * | 8/2004 | Sakai et al. ................... 382/290 |
| 7,027,666 | B2 | 4/2006 | Rudak et al. |
| 2004/0252912 | A1 | 12/2004 | Yang |
| 2006/0045379 | A1 * | 3/2006 | Heaney et al. ................ 382/276 |
| 2008/0018941 | A1 | 1/2008 | Taylor |
| 2009/0290809 | A1 * | 11/2009 | Yamada ........................ 382/266 |
| 2012/0008874 | A1 * | 1/2012 | Soutsuka et al. ............. 382/286 |
| 2013/0201358 | A1 * | 8/2013 | Sun ............................. 348/222.1 |

OTHER PUBLICATIONS

International Search Report for PCT Application No. PCT/IN2009/000373, Austrian Intellectual Property Office, Jun. 24, 2011.

Banerjee S et al: "Real-time embedded skew detection and frame removal", International Conf. on Image Processing (ICIP 2010), USA, Sep. 26, 2010, pp. 2181-2184, XP031813004.

EP Search Report, mailed Jan. 25, 2013; issued in related PCT Application No. 09846750.9.

Zramdini, et al, Optical font recognition from projection profiles, Electronic Publishing vol. 6(3), Sep. 1993.

Kittler, et al. Minimum Error Thresholding, Pattern Recognition vol. 19, 1966.

Kittler, et al. Threshold Selection Based on a Simple Image Statistic, 1984.

Kurita, et al, Maximum likelihood thresholding based on population mixture models. Pattern Recognition vol. 25, 1992.

Otsu, Nobuyuki, A Threshold Selection Method from Gray-Level Histograms, IEEE Transactions on Systems, Man. and Cybernetics, Jan. 1979.

Shi, et al. Normalized Cuts and Image Segmentation, IEEE Transactions on Pattern Analysis and Machine Intelligence, Aug. 2000.

Simske, et al. Digital Capture for Automated Scanner Workflows. DocEng04, Oct. 28-30, 2004.

Simske, Steven J. The use of XML and XML-data to provide document understanding at the physical, Logical and presentational levels, Hewlett-Packard Company.

Wahl, et al. Block Segmentation and Text Extraction in Mixed Text/Image Documents, Jan. 1982.

Wilkinson, Michael H. F. Optimizing Edge Detectors for Robust Automatic Threshold Selection: Coping with Edge Curvature and Noise. 1998.

* cited by examiner 401
402

(a)

θ=6°

(b)

θ=6°

(c)

θ=14°

FIG 15
 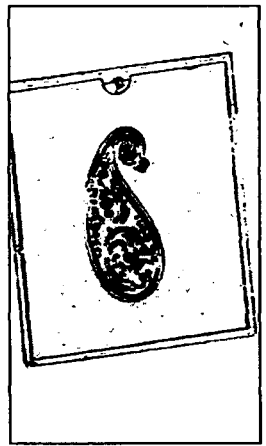 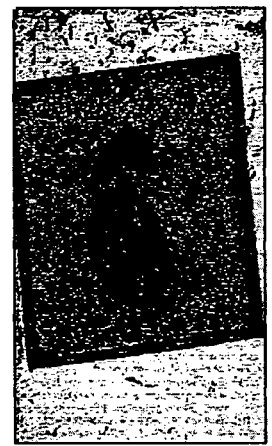
FIG 16A  FIG 16B  FIG 16C

— I/p Swaths
••••• O/p Swaths
----- To crop

SKEW DETECTION

CLAIM FOR PRIORITY

The present application is a national stage filing under 35 U.S.C. 371 of PCT application number PCT/IN2009/000373, having an international filing date of Jul. 2, 2009, which is incorporated by reference in its entirety.

BACKGROUND

Skew detection is relevant to a wide variety of applications, and particularly in document image processing tasks. When scanning or photocopying a paper document, for example, skew may occur in the output. Causes can include incorrect document placement on the platen glass; or movement of the object while closing the scanner lid. In scanners, photocopiers and fax machines with an Automatic Document Feed (ADF), skew can be introduced when inserting the document or due to slight misalignment by the ADF itself.

When skew occurs, the user of the document processing device would like it to be corrected. Skew correction also promotes more accurate Optical Character Recognition (OCR) operations, and the de-skewed (skew-corrected) document is more likely to be useful for subsequent downstream operations such as archiving, modifying, collaborating, communicating or printing.

In general, state-of-the-art image processing algorithms for skew detection and correction are unsuitable for on-platform, real-time and robust implementation. Known skew detection algorithms are typically based only on one source of skew information from the document image. As a result, these skew detection algorithms work well only for a certain, limited classes of documents and are not generally applicable across the whole range of documents that may be encountered in practice; which is desirable for robust embedded implementation within a device.

BRIEF DESCRIPTION OF THE DRAWINGS

For a better understanding of the invention, embodiments will now be described, purely by way of example, with reference to the accompanying drawings, in which:

FIG. 12b shows a graphic representation of a LHS image profile for the digital image of FIG. 12a;

FIG. 13b shows a graphic representation of a LHS image profile for the digital image of FIG. 13a;

FIG. 15 shows an original digital image of a dark document having a dark background;

FIG. 16a shows a binarized version of the digital image of FIG. 15 using an optimal binarization threshold value in accordance with an embodiment;

FIG. 16b shows a binarized version of the digital image of FIG. 15 using a lower binarization threshold value than that used to create the digital image of FIG. 16a;

FIG. 16c shows a binarized version of the gradient image of the digital image of FIG. 15 using a higher binarization threshold value than that used to create the digital image of FIG. 16a;

DETAILED DESCRIPTION OF THE INVENTION

Figure 1:
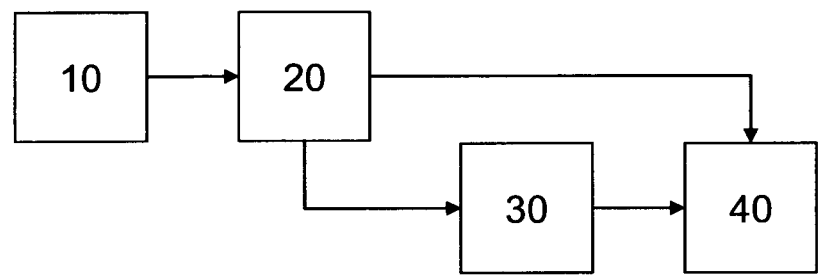
FIG. 1 is a functional block diagram showing the logical arrangement of elements in a document image processing apparatus according to an embodiment.

According to embodiments of one aspect, there is provided a skew detection apparatus for estimating a skew angle of a document, comprising: an input, for receiving in sequence a plurality of segments of an image of the document, each segment comprising a plurality of rows of pixels (a swath of image); a skew estimation unit, adapted to generate an estimate of skew for each segment; and an estimate combination unit, adapted to generate a combined estimate of the skew angle, based on the estimates of skew from one, two, or more such segments.

When documents are scanned or copied, the image of the document may be created in segments or "swaths". Each segment comprises a strip of the document-image, including several rows of pixels. When an ADF is used, the segments will usually extend transversely to the feeding-direction. This means that the document is scanned progressively as it is fed through the ADF. When the document image is provided in this incremental form, it may be desirable to detect skew in a similar incremental way. An embodiment according to this aspect may provide such a progressive, pipelined approach to skew detection. The need to process the document-image in segments may impose additional requirements on the skew detection algorithm or algorithms to be used. For example, the algorithm should not rely on the availability of the whole document image in order to detect skew. The skew detection algorithms to be described herein are examples of algorithms that meet the necessary requirements. They are therefore suitable for adaptation for pipelined, segment-based skew detection.

In embodiments of another aspect, there is provided document image processing apparatus comprising: an imaging unit, operable to create an image of a document in segments, each segment comprising a plurality of rows of pixels; skew detection apparatus as described above; and skew correction apparatus, adapted to correct the skew of each segment by rotating it by an angle corresponding to the combined estimate of skew, wherein the skew correction apparatus is operable to begin correcting the skew of the first segment created by the imaging unit before a second later segment has been created by that unit.

Embodiments of this apparatus may exploit the progressive, incremental nature of the skew detection algorithms described, by implementing a pipeline in which skew correction of segments of the document can start as early as possible. This may enable the skew correction to be completed faster (that is, the overall latency may be reduced). Meanwhile, the memory requirements of the system may be reduced, compared with known algorithms, because it is not necessary to store the whole document-image before beginning skew detection and correction.

In embodiments of another aspect, there is provided skew detection apparatus, for estimating a skew angle of a document, comprising: an input, for receiving an image of the document; a first skew estimation unit, adapted to generate a first estimate of the skew angle based on a mutual alignment of peripheral boundary points of the document itself or peripheral boundary points of foreground content of the document; a second skew estimation unit, adapted to generate a second estimate of the skew angle; and an estimate combination unit, adapted to generate a combined estimate of the skew angle, based on at least the first and second estimates. The second skew estimation unit can generate the second estimate based on the orientation of foreground or background content in the interior of the document. For example, the second estimate may be based on the dominant orientation of contiguous areas of background (that is, regions between lines of text or around other content such as images).

For example, the first skew estimation unit may implement a Hough-transform-like operation, as mentioned above, on the document and/or content boundaries. Other similar algorithms could also be used: for example, it is possible to fit a rectangle of minimal area to the full set of boundary points (on all four sides). A skew estimate can then be determined from the orientation of the rectangle of best fit. These examples are not exclusive or limiting on scope, as will be understood by one skilled in the art.

The second skew estimation unit may perform skew estimation by a method such as Piecewise Covering by Parallelograms (PCP), as described in greater detail below. This algorithm estimates skew based on the orientation of a set of linear strips of the document containing no foreground content. Another alternative is to analyze horizontal projection profiles formed by content (text lines) and white spaces in between content at successively incremented angles. This approach could also work by first detecting a number of fiduciary points in the interior of the document content (for example, the extrema of connected components of foreground content). Then, the mutual alignment of these fiduciary points is analyzed at a variety of angles. The skew estimate is derived by optimizing a function of the horizontal projection profile of these fiduciary points. Still another alternative for the second skew estimation unit might be a Hough-transform-type analysis on these fiduciary points of connected components. These examples are not exclusive or limiting on scope, as will be understood by one skilled in the art. Such algorithms have in common that they estimate skew by analyzing the characteristics of the interior of the document (as opposed to simply the margins). Note that any of the methods may be applied to the document binary image, or to edges detected in that image, or to edges detected in an original (grayscale) image of the document.

Note that "foreground" and "background" content may be defined differently in different applications. For many documents, the background is light and the foreground dark (for example, when printing with black ink on white paper). In other cases, this assumption may not hold—for example in the "negative" case of light text on a dark background. However, irrespective of the color of the foreground and background, they can often be successfully discriminated by using a gradient (or edge) image. When using a gradient image, absolute color or brightness levels do not affect the result: the background will be uniform, whereas the foreground content will contain discontinuities or edges.

According to embodiments of yet another aspect, there is provided skew detection apparatus, for estimating a skew angle of a document shown in an image, the apparatus comprising: an input for receiving the image; and a processor adapted to, for each of a plurality of sides of the image: determine the locations of a set of foreground pixels or a set of edge pixels of the document that are nearest to the side of the image; generate from said set of pixels an estimate of the probability distribution of the angle of a line joining any two pixels from the set; and determine the angle corresponding to the maximum value in the estimated probability distribution, to produce a first estimated skew angle by combining said angles determined for each of the plurality of sides of the image, and to estimate a first confidence value for the first estimated skew angle.

For example, the apparatus can perform a Hough-transform-like operation, finding the mode of the orientations of lines between pairs of boundary points. The boundary points may lie on the boundaries of the document (that is, the page edges) or on the boundaries of document content (for example, a set including the first foreground pixel found on each row or column when traversed from four sides of the document, which could lie on text lines or other foreground document content). Note that boundary points of either type, or a mixture of the two types, can be input to the algorithm. It is generally not necessary to identify which type of boundary point is which. For either type of boundary, detection may be either by finding the foreground pixels that are nearest to each side of the image; or, alternatively, the edge pixels that are nearest to the side. Here, edge pixels means pixels at which a change in the image intensity or color occurs. For example edge pixels might be derived from a spatial derivative of the image containing the document. Edge-detection methods of this kind are well known to those skilled in the art.

Skew information in a document image can come from many sources, including: a) visible straight paper edges b) straight text lines c) Manhattan layout. Manhattan layout refers to the (virtual) bounding boxes of blocks of text or graphics, which normally are rectangular or at least have straight boundaries. Character orientation information can also be used—using knowledge of the shape of characters to determine their orientation; however, since character shapes depend on the language and script written on the document, these methods are script dependent.

According to some embodiments, there is provided an approach for skew detection that can combine information from three sources:

1. Scanned document image content (exploiting the assumption that text lines or in general any type of content is aligned to the orientation of the document).

2. Content boundaries. Normally boundaries have straight lines or they are aligned as content which is right or left justified. Even for unaligned or center-aligned text, the top and bottom boundaries are usually straight.

3. Paper (that is, document) edges in the scanned image.

An exemplary embodiment of such a skew detection apparatus will now be described. This apparatus is suitable for implementing progressive skew-detection, as described earlier above. However, it is not essential that it operates in this way.

FIG. 1 shows a functional block diagram of a document image processing apparatus according to an embodiment. By functional, it is meant that the individual units shown may be merely separate logical elements of the apparatus; however, the physical arrangement of these units may differ from the arrangement shown in FIG. 1.

The apparatus comprises an imaging unit 10, such as the image sensor and platen glass of a flat-bed scanner. The imaging unit 10 generates a digital image of a document. In this image, the document may be skewed by an unknown angle. The image is provided by the imaging unit 10 to a memory 20, where it is stored. From the memory, the image is provided to a skew detection apparatus 30. This detects the skew angle of the document. The detected skew angle is then used by a skew correction apparatus 40 to correct the skew. This is achieved by rotating the image of the document by the negative of the detected skew angle. Suitable methods for skew correction by image rotation will be known or readily apparent to the skilled person.

In a pipelined implementation, the image is generated by the imaging unit 10 in segments. These segments are sequentially stored in the memory 20, which may act as a buffer. The skew detection apparatus 30 reads the first segment from the memory as soon as it is available. Skew detection proceeds on this first segment. As subsequent segments are written by the imaging unit to the memory, skew detection is also performed on these. When the skew detection apparatus has a reliable estimate of the angle of skew, the skew correction unit begins correcting the segments, also in order. A reliable estimate may be one for which the detected skew angles of two or more segments have agreed to within an acceptable tolerance. Alternatively, for example, the average angle for a predetermined number of segments may be used. In either case, skew correction can begin after a subset of the total number of segments has been analyzed. That is, skew correction can begin before the complete document has been scanned by the imaging unit 10. An example method suitable for rotating an image in segments (swaths) will be described in greater detail below.

Figure 2:
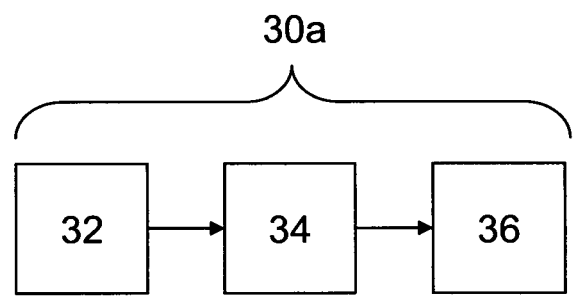
FIG. 2 is a block diagram showing the logical arrangement of elements in an example skew detection unit for the embodiment of FIG. 1.

FIG. 2 shows an example of a skew detection apparatus 30a that can be used in a pipelined implementation. This comprises an input 32, for receiving an individual segment of the image from the memory 20; a skew estimation unit 34, for estimating the skew angle for the current segment; and a skew estimate combination unit 36, for combining the skew estimation results for several segments.

Figure 3:
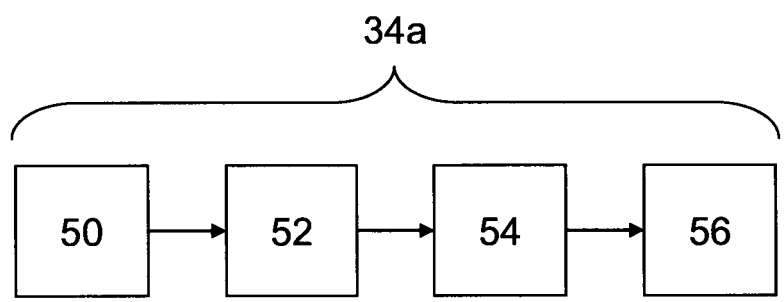
FIG. 3 shows the logical arrangement of elements in an example skew estimation unit for the embodiment of FIG. 2.

FIG. 3 shows an example 34a of the skew estimation unit 34 in FIG. 2. This comprises a gradient calculation unit 50; a thresholding unit 52; a first skew estimation unit 54 and a second skew estimation unit 56.

The gradient calculation unit computes one or more spatial derivatives of the input image or input segment. Partial derivatives could be calculated using a linear filter such as the Sobel edge detection kernel, for example. The magnitude of the gradient vector at each pixel can then be computed from the individual partial derivatives. This process results in a floating point or integer valued gradient image (depending on the form of the input and the filter coefficients used).

The gradient image is binarized by the thresholding unit 52, to produce a binary-valued edge map. The threshold applied may be fixed or adaptive. A pre-processing method for adaptive threshold selection will be described later below.

The first skew estimation unit estimates the skew of the document based on an Adapted Quasi-Hough Transform (AQHT), to be described further below. Briefly, this algorithm exploits information from pixels at the boundary of the document (the page-edge) or pixels at the boundary of the foreground content of the document (for example, the margin of the page). It does this by scanning each row of the image for the first edge pixel—in other words, the first pixel whose gradient value exceeds the threshold set for binarization.

The second skew estimation unit estimates skew based on an algorithm denoted Enhanced Piecewise Covering by Parallelograms (EPCP), also to be described further below. Briefly, this algorithm exploits information from foreground content pixels in the interior of the document. It is therefore complementary to the AQHT algorithm.

Figure 4:
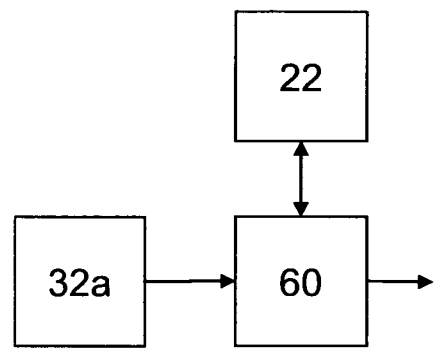
FIG. 4 is a structural block diagram of a skew detection apparatus according to an embodiment.

FIG. 4 shows an example of how a skew detection apparatus might be embodied. There is an input 32a for receiving the image of the document. This input could be an imaging unit as described above or a communications interface for receiving the image from an imaging unit or a memory. A microprocessor 60 stores the received image in memory 22 and performs the skew detection, to determine the skew-angle. The microprocessor 60 may be specially adapted in hardware to perform the skew detection methods and/or it may be programmed by software to do so. The memory 22 can be chosen from among a wide variety of known types.

Figure 5:
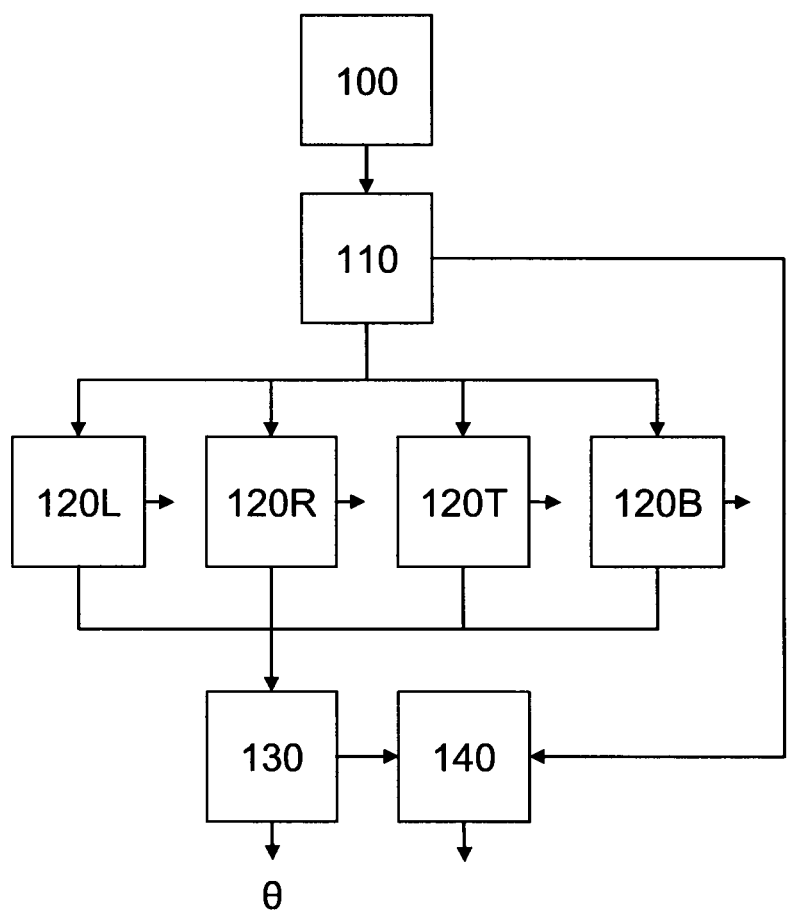
FIG. 5 is a flow chart illustrating an Adapted Quasi Hough Transform (AQHT) algorithm for skew detection.

The AQHT algorithm executed by the first skew estimation unit in FIG. 3 will now be described, with reference to FIG. 5.

In step 100, the document image is preprocessed (for example, by the gradient calculation unit 50, and thresholding unit 52, described above). This step aims to minimize noise while uniquely binarizing the image. It preferably maximizes visibility of paper edges, if they are available in the image.

As part of the pre-processing the image may also be reduced in size to approximately 40 dpi resolution, for example by replacing each non-overlapping N×N block with a black pixel if that block contains at least one black pixel. (Note that it is generally assumed herein that black pixels correspond to foreground content and white pixels correspond to background). This lightweight down-sampling reduces resolution, but retains the information needed for skew detection.

The AQHT algorithm relies on foreground content boundaries and paper edge information in the scanned image. These are indicated by edge pixels (as found in the edge map, for example) near to the side of the image. Thus, in step 110, the pre-processed gradient or edge image is traced for the first foreground (black) pixels from all four sides of the document, providing four sets of content boundary points. That is, each row and each column of pixels in the image yields two boundary points: the rows are traced from the left and right, to yield two boundary points; and the columns are traced from the top and bottom to also yield two boundary points. If paper edges are present in the (gradient) image, they are captured in this step. If not, the content boundary points are captured. Thus, page-edge and content-edge pixels are found, without necessarily knowing which boundary pixels are of which type.

The AQHT algorithm is applied to each set of these points (left, right, top, and bottom). This is shown as the four parallel steps 120L, 120R, 120T, and 120B, respectively. For one side (and corresponding set of points), the AQHT algorithm analyses the orientations of lines joining pairs of points in the set.

The number of these points may be very large, and the number of possible pairings rises with the square of the number of points. Therefore, in the present embodiment, for each point in the set, only a subset of the other points is paired with that point. This can reduce the computational burden. For example, the 50 nearest points to each point can be used. It may also be beneficial to eliminate points which are too close to the pixel in question (for example: closer than 5 pixels). Note that, here, nearness is defined by distance parallel to the image edge being analyzed. That is, the distance is either the row- or the column-distance between pixels.

For the selected pairs of points, the angle of the straight line joining each pair is recorded in an angle histogram. The histogram entries can be binned (quantized). To estimate the skew angle for this side of the image, the histogram bin with maximum value (that is, maximum number of point-pairs falling in it) is found. Thus, the output of each of the steps 120L, 120R, 120T, and 120B is an estimate of skew angle for the respective side of the image.

The histogram in the AQHT comprises an estimate of the probability distribution of the angle. As will be apparent to the skilled person, other estimates could be used. The underlying principle is that if all the input points are generated by points (pixels) on a straight line, the angles formed by any pair of them should fall in same histogram bin. This bin will have maximum votes, making it win. The corresponding angle for that bin indicates the angle of skew. This method uses the mode of the angular probability distribution. However, other statistics could also be used.

The histogram algorithm can potentially be made more accurate by recording additional information: for each histogram entry, the sum of all angles falling into the bin can be accumulated; this total can then be used for calculating the mode, by dividing by the number of pixel-pairs counted—that is, by using the mean of the angles falling in the winning bin. This may avoid loss of angular resolution due to the binning in the histogram. The method should also compensate for the 90° shift, for the top and bottom sides, compared with the left and right sides. When this shift has been corrected, all four angles are directly comparable.

As described above, AQHT is applied on each of the four sides of the image separately, yielding four representative angles, one for each page-edge or document margin (the algorithm can also deal with fewer than four sides if required for swath based detection). In step 130, these four angles are combined by grouping them. In the present embodiment, this is achieved by an agglomerative merging algorithm. This adds angles that are close to an existing cluster to that cluster, and also merges clusters if their members are close together. Each group or cluster defines a range of angles, between the minimum and maximum angles among the members of that cluster.

The process is as follows:
1) Create a new "cluster" for the first angle. Set min=max=angle for this cluster.
2) Loop through the remaining angles.
3) If the next angle falls between min−T and max+T of a cluster, the angle is deemed to be part of that cluster [Call this cluster A]. If not, a new cluster is created containing just this angle [Skip steps 4 and 5]. Here T is a predetermined threshold; an example of a suitable value of T is 1 degree.
4) Update min and max of this cluster A.
5) Check if this modified cluster A needs to be merged with another existing cluster: for each other cluster, check if the new values max and min for cluster A are within min−T and max+T of this other cluster. If they are, add all the angles of that cluster into cluster A and then remove it [set the size of the cluster to zero and set min=infinity and max=−infinity]. Note that it is not possible for cluster A to merge with more than one other cluster.
6) Loop End: go to step 2.

The grouping enables the consistency among the four angles to be checked and a confidence measure to be produced in step 140. The confidence measure is calculated based on the "strength" of the clusters. The strength of each group is assigned based on:

a) The distance of the detected set of boundary pixels to the side of the image (the closer the points are to the side, the less is their reliability, resulting in a low strength value)

b) Whether the points belong to a page edge (high strength) or content edge (low strength).

The strength of a cluster is defined as the sum of the strengths of all the sides—corresponding to skew-angle estimates—assigned to that cluster. The strength of a side is set to 60, by default. If the side has a page edge (as opposed to a content boundary), its strength is increased to 100. The idea is to give more weight to paper edges than content boundaries, as paper edges are considered to be better sources of skew information.

If the side is determined to have a page edge, an additional test is applied in which the distance of each boundary point to the side of the image is considered. If 80% of the points are too close (based on a preset threshold of, for example, 40 pixels) to the side, the strength for this page edge is reset to the minimum—that is, 60. It is believed that this step may reduce, to some extent, the interference of linear noise which might appear near the side of the image.

A side is classified as a page-edge or content-boundary as follows. The observation is that if the given set of points contains a long enough continuous linear segment (for example, ~50% of the paper size in that dimension) it is likely to be a page edge. The classifier scans through all the detected edge points, maintaining connected segments along the way. For each connected segment of a non-trivial size, the algorithm calculates a measure of linearity—the standard deviation of the orientation angles of the lines formed by joining all points with the mean point. Sometimes, due to noise, a big linear segment is broken up and the individual pieces are not long enough. To mitigate this, the classifier algorithm checks if the current segment and the previous segment fall on the same line. This is done by checking the standard deviation of the orientation angles of the lines formed by joining all points in the first set with the mean point of the second set and vice versa. The algorithm maintains a variable that keeps track of the size of the largest linear segment. Every time the current segment is linear with its linear predecessor (and is not too distant) the algorithm adds the length of the current segment to that variable. Once the value reaches a threshold (that is, there is a big enough segment), the classifier terminates and returns, indicating the presence of a page edge. If the length variable never reaches the threshold, there is no page edge.

With the strength defined as above, the overall confidence can be defined as follows. If the strongest group consists of only one angle (that is, all groups contain one angle), the confidence measure is set to 0.25. If the strongest cluster contains all four angles, the confidence value is set to 1. If neither of these conditions is true, the following formula is used to determine the confidence metric:

Confidence=strength (Group 1)/[strength (Group 1)+strength (Group 2)]

where Group 1 and Group 2 refer to the strongest and second strongest groups, respectively.

The confidence measure is thus calculated as the "strength" of the top (strongest) cluster divided by the sum of the strengths of the top two strongest clusters.

The time complexity of the AQHT approach is order of Max(M×N; (Amax−Amin)/Ares), while the memory complexity is of the order of 3(M×N). Here, M×N is the image size; Amax is the maximum skew angle and Amin is the minimum skew angle expected (this determines the range of the histogram bins). Ares is the angular resolution used for skew detection (the histogram bin size).

If the AQHT algorithm is unable to detect the skew with sufficiently high confidence, another estimate of skew angle may be calculated based on a different source of information. In the present embodiment, the second algorithm is called Enhanced Piecewise Covering by Parallelograms (enhanced PCP or EPCP). This analyzes the interior foreground and background content of the document image, to arrive at an estimate of skew that is independent of that generated by AQHT. In particular, EPCP tries to find the dominant orientation of strips of background (in this example, white) between pieces of foreground content. So, for example, EPCP tries to find the orientation of the white space between consecutive lines of text, or between a rectangular photograph and a line of text.

The EPCP algorithm executed by the second skew estimation unit in FIG. 3 will now be described, with reference to FIGS. 6-8.

According to PCP the document is divided into vertical slabs and content within each slab is examined by tracing scan lines at varying angles. If a scan line traverses only white pixels, then that scan line will be counted as part of a white parallelogram. The particular angle of the scan lines for which the total area of the white segments is maximized will be the estimate of the skew.

This process of white segment computations will be done for all the slabs present in the document image. The principle and operation of the method is illustrated by FIGS. 6 and 7. FIG. 6 shows a piece of text which has been divided into vertical slabs by dividing lines 402. The text is scanned by scan-lines 401. The scan lines drawn on FIG. 6 show only those lines which cross a black (that is, foreground) pixel. In the example shown, the angle of the scan lines does not precisely match the orientation of the text. However, as the angle of the scan lines is varied and becomes more closely parallel to the lines of text, the number of scan lines that will detect (that is, cross, or traverse) a black pixel will be reduced. Conversely, the number of "white" scan lines will increase.

Figures 6, 7:
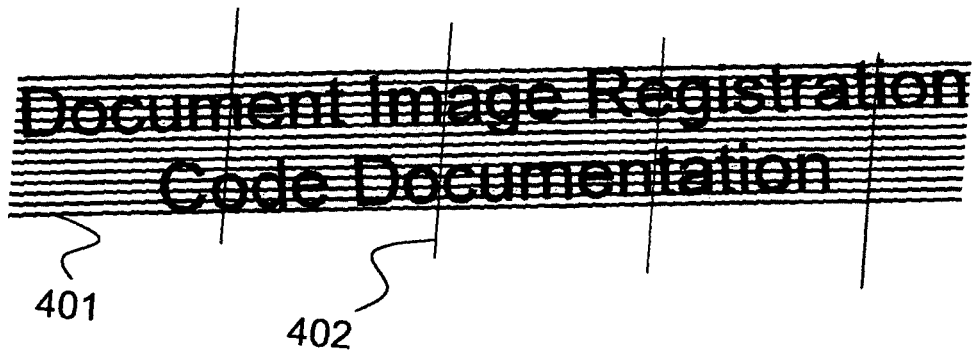
FIG. 6 shows the superimposition of scan-lines on a piece of text, in an Enhanced Piecewise Covering by Parallelograms (EPCP) algorithm.
FIG. 7 illustrates the principle of how the orientation of interior document content is detected using the EPCP algorithm.

FIG. 7 shows an example of how the area of white parallelograms varies for different scan line orientations. FIG. 7(a) shows a piece of text skewed at an angle of 6 degrees (to the horizontal). FIG. 7(b) illustrates the segments that would be found by scanning at the correct orientation. The grey segments indicate the non-white parallelograms. FIG. 7(c) illustrates the segments found when the scan lines are instead oriented at an angle of 14 degrees. Clearly, a greater number of white parallelograms is found at 6 degrees and the total area is also found to be greater.

One drawback with this basic PCP approach is that it may not robustly estimate skew angles for documents with vertical-flowing-text (VFT) lines touching the boundaries of the document. This often happens while scanning Chinese or Japanese documents, for example. To help address this problem in the present embodiment of EPCP, the piecewise covering by parallelograms is evaluated a second time, with the document rotated by 90 degrees.

Figure 8A:
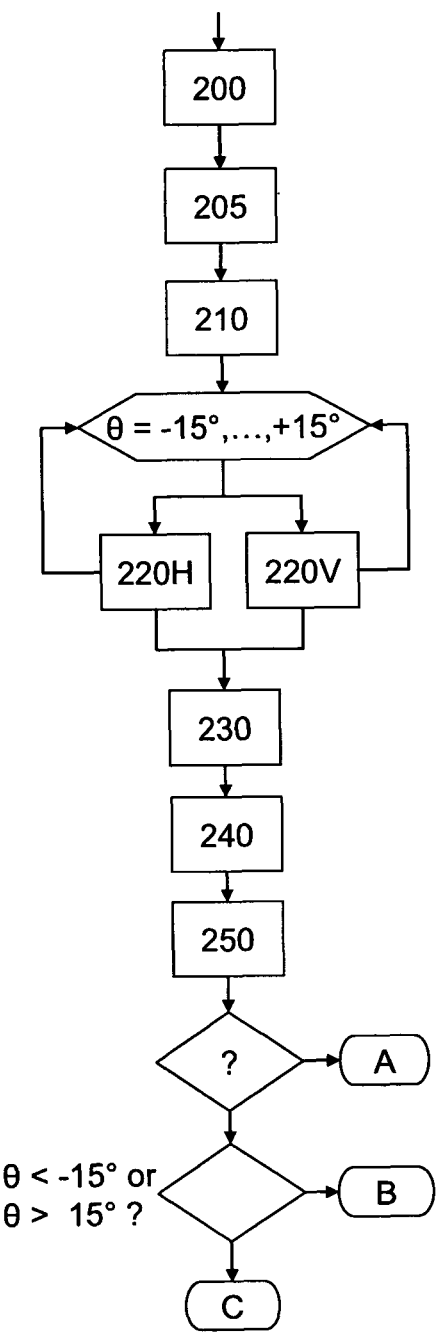
FIGS. 8A and 8B are a flow chart illustrating the EPCP algorithm.
Figure 8B:
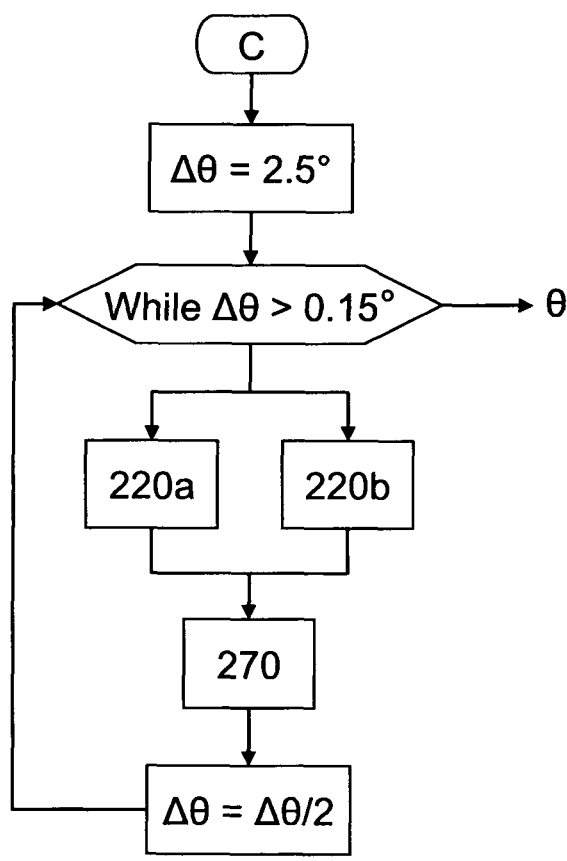

In greater detail, the algorithm is illustrated by the flowchart of FIGS. 8A and 8B. Steps 200, 205 and 210 comprise pre-processing. In practice, in embodiments, it is likely that these steps will be at least partially shared with the pre-processing performed for the AQHT algorithm. However, an example of suitable pre-processing is described here for completeness. In step 200, the document image is binarized, by applying a suitable threshold. The binary image is reduced in size and resolution by down-sampling in step 205. In step 210, edge detection is performed on the down-sampled, binary image. This may comprise detecting pixels where the binary image changes from black to white or vice versa.

The EPCP algorithm is then performed for a range of angles, for each of horizontal (220H) and vertical (220V) orientations of the document image. In the present embodiment, the range of angles is from −15 to +15 degrees. At this stage of the method, a coarse search is performed, to help reduce computational complexity. In this example, therefore, a step size of 5 degrees is used. This results in 7 repetitions of the PCP algorithm for each orientation. The output of each repetition is an indication of the total area of white background detected. This can be provided by the number of scan lines which did not cross a black pixel. Note that the slab width is fixed (for example, based on the length of the image, by taking the length in pixels divided by 4, and rounding the result to the nearest integer number of pixels). However, the final slab (on the right) may have a differing number of columns, if the image width is not an integer multiple of the slab width.

In step 230, the direction of text flow is determined. To do this, the method computes the variance of the 7 values of white-segment area for each of the horizontal and vertical orientation. The orientation having the higher variance is selected as the one corresponding to the dominant flow-orientation in the document. Thus, for example, if the PCP output using vertical slabs (substantially horizontal scan-lines) generated the higher variance, then the text-flow direction is determined to be horizontal.

In step 240, having determined text-flow direction, the scan-line angle that yielded the maximum area of white segments is chosen as the coarse estimate of skew.

In step 250, a confidence measure is evaluated. This is intended to distinguish between a coarse estimate that is expected to be accurate and one where the method may have failed.

The area values that are computed at the coarse level are used in the measure of confidence. Using the seven values of white-area that are computed at every angle from −15 degrees to +15 degrees (in steps of 5 degrees), the values are ordered in sequence by angle. Then, the global maximum (GM) and the next highest local maximum (LM) in this sequence are determined. The confidence measure is then defined as follows:

Diff=GM−LM

Confidence=1; if Diff>T

0; otherwise

Here, T is a dynamic threshold which has been empirically fixed, in this embodiment, at 10% of the global maximum. If the sequence of area values has no other local maximum value, LM, the confidence value is also set equal to 1. Thus, the confidence measure returns a value of 0 if the coarse estimate is believed to be suspect, while a value of 1 indicates that the algorithm is confident in the estimate. The confidence measure is based on the assumption that if the detected white-segment areas for two different (non-adjacent) angles are very similar, the resulting estimated angle may be unreliable.

If a confidence value of 0 is returned, the subsequent steps of skew estimation are skipped and a subsequent skew correction/rotation module will simply display/output the input image without attempting any correction. In this way, the confidence measure module may help to avoid the possibility of wrongly skew-correcting the image. This is shown in FIG. 8A by the termination of the flowchart at A.

If the confidence measure returns 1, the algorithm proceeds to check whether the actual skew angle of the document is outside the range evaluated by PCP—in this case, [−15,15]. This is done only in the case that the peak (that is, global maximum) white-area value of PCP is on the limits of the range—that is, either on −15 degrees or on +15 degrees. In this case, the algorithm proceeds by further evaluating two PCP steps beyond that end of the range, in steps of 0.5 degrees. If either of the two resulting values is greater than the previous "maximum" value at the end of the range, this indicates that the true skew angle lies outside the evaluated range. If so, the method terminates at B.

If the confidence was high and the angle is determined to be within-range, PCP is iterated with increasingly finer angle step-sizes. This is illustrated in FIG. 8B. The step-size $\Delta\theta$ for the fine-grain PCP is initialized to half of the previous (coarse) step size, that is, 2.5 degrees. Then, starting with the coarse estimate, 0, already obtained, the iterative estimation proceeds by computing the white-segment areas for $(\theta+\Delta\theta)$ and $(\theta-\Delta\theta)$, in steps 220a and 220b, respectively. The maximum among the three area values determined for $\theta$; $(\theta+\Delta\theta)$; and $(\theta-\Delta\theta)$ is then used as the updated estimate for the next iteration. After each iteration, the step-size $\Delta\theta$ is halved. The algorithm should therefore converge to an increasingly accurate estimate of skew, stopping when the step size reaches 0.15 degrees. Finally, the fine estimate of angle $\theta$ is output.

Figure 9:
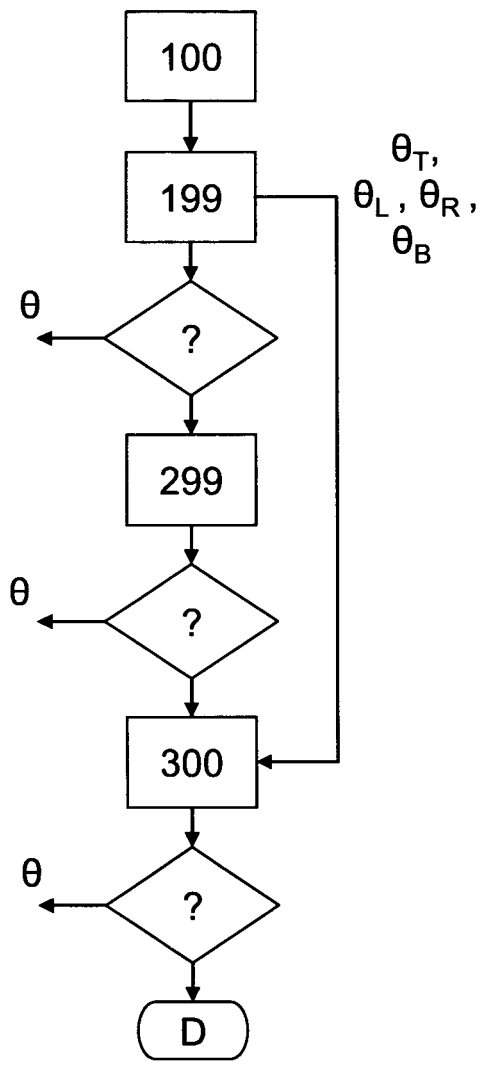
FIG. 9 is a flowchart illustrating an integrated skew detection method performed by a skew detection apparatus according to an embodiment.

The operation of a skew detection apparatus according to an embodiment of the type shown in FIG. 2 will now be described, with reference to FIG. 9. First there is typically a pre-processing step 100 (for example as discussed earlier above). Next at step 199, skew is estimated by a first method—in particular, one which uses the alignment of pixels on the boundaries of the document and/or the content of the document to estimate skew. This may be, for example, the AQHT algorithm described above, with reference to FIG. 5.

If this first algorithm is confident in its output, the first estimated skew angle $\theta$ is output. If not, another skew estimation approach is tried, in step 299.

In particular, this second method relies on pixels in the interior (rather than the boundary) of the document content. This second method may be, for example, the EPCP algorithm described above.

Again, it is determined whether the second skew estimate has a sufficiently high confidence value. If so, the second estimated skew angle $\theta$ is output. If not, in step 300, consistency between the first and second estimates is assessed. In the example embodiment described, the AQHT algorithm has produced four skew angles in the course of making the first skew estimate. The EPCP algorithm has produced a single estimate. The single angle generated by EPCP is compared with each of the four angles generated by AQHT. If the angle generated by EPCP is within 1 degree of at least two of the four AQHT angles, this angle is output as the final estimate. If not, no estimate is output, and no skew correction should be performed on the document image. This outcome is indicated by the termination D in FIG. 9.

In one segment/swath based embodiment of skew detection, AQHT will estimate a skew angle for each swath. This estimation will be either with 3 or 2 edges per swath, as the top and bottom-most swaths will also have pixels respectively corresponding to top and bottom margin pixels in addition to left and right margin pixels (which should be available for all swaths). If AQHT is not able to confidently predict the skew, ePCP would use the content of the swath in order to estimate the skew. The estimates will be built up across swaths, binning similar estimates, and the most frequent estimate across swaths will be used if there are enough swaths in a bin. This can be done on enough swaths in the image so that there is confidence in the estimate (that is, as soon as there are enough swaths in the most popular bin, based on a predefined threshold). Alternatively, if the total number of swaths analysed needs to be predefined, then at the end of those number of swaths the algorithm will output the estimated skew or, if there are still too few swaths in the most popular bin at that time, the algorithm will output "no-confidence". The latter approach has the advantage that the latency of the skew-detection process can be predicted in advance. However, the former approach may generate "confident" estimates more often, because it persists until it meets the confidence threshold (unless it reaches the final swath first).

The estimate of skew angle obtained by this combined approach may be better than any of the individual approaches in isolation, yet without significant penalty in terms of speed. Each of the individual algorithms uses a different type of information to detect skew of the document. Thus, if one algorithm fails, it is possible that the other will then be successful.

As mentioned previously above, it may be beneficial to pre-process the input document image before input to the AQHT or EPCP algorithms. One suitable pre-processing method will now be described. This seeks to detect intensity edges in the input document image using an adaptive threshold on the gradient image.

Figures 10, 11:
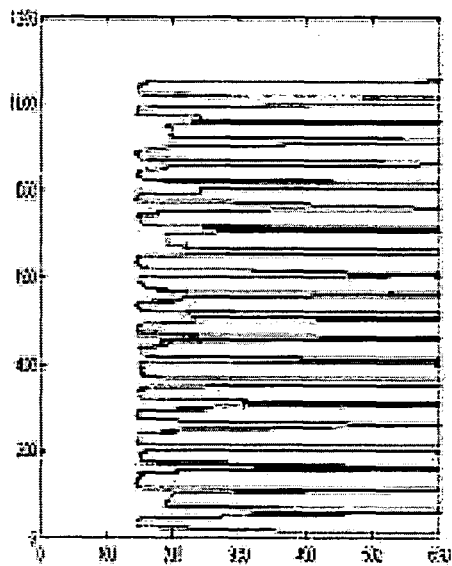
FIG. 10 shows an exemplary digital image of a printed document.
FIG. 11 shows a graphic representation of a LHS image profile for the digital image of FIG. 10.

FIG. 10 shows an exemplary digital image of a printed document, and FIG. 11 shows a graphic representation of a LHS image profile for the digital image of FIG. 10. The graphic representation shows the location of a first edge pixel for each row when viewed from the LHS of the image of FIG. 10. FIG. 11 shows the LHS margin profile of the printed text in FIG. 10 as being similar to a periodic square wave.

Figure 12A:
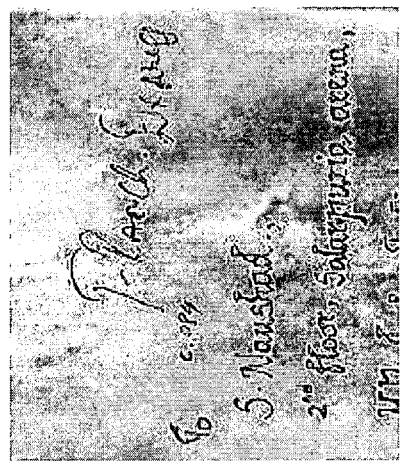
FIG. 12a shows an exemplary digital image of a handwritten document.
Figure 12B:
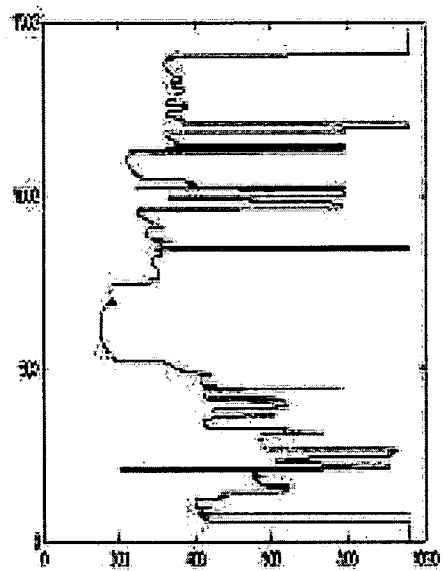

FIG. 12a shows an exemplary digital image of a handwritten document, and FIG. 12b shows a graphic representation of a LHS image profile for the digital image of FIG. 12a. The graphic representation shows the location of a first edge pixel for each row when viewed from the LHS of the image of FIG. 12a. FIG. 12b shows the LHS margin profile of the handwritten text in FIG. 12a as being similar to a randomly undulating line.

Figure 13A:
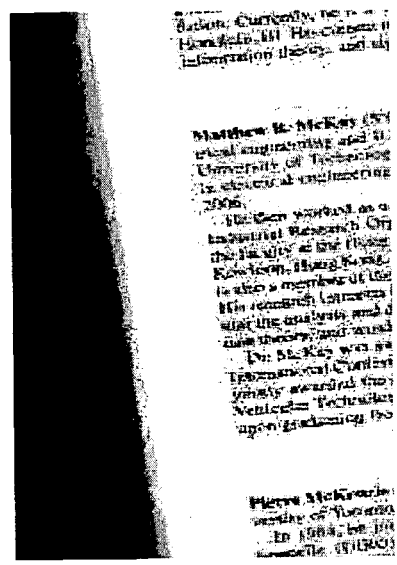
FIG. 13a shows an exemplary digital image of a skewed document page.
Figure 13B:
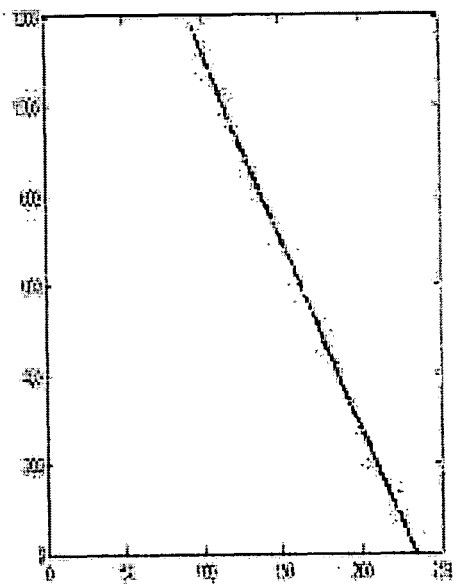

FIG. 13a shows an exemplary digital image of a skewed document page, and FIG. 13b shows a graphic representation of a LHS image profile for the digital image of FIG. 13a. The graphic representation shows the location of a first edge pixel for each row when viewed from the LHS of the image of FIG. 13a. FIG. 13b shows the LHS margin profile of the skewed document page in FIG. 13a as being a substantially straight line, with a gradient proportional to the angle by which the document is skewed from vertical.

Embodiments use the concept of margin profiles to enhance page edge detection of a scanned document.

Figure 14:
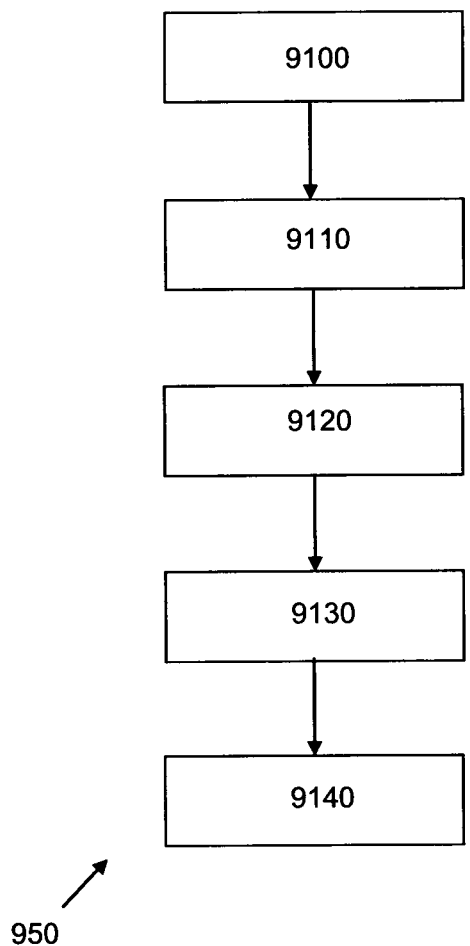
FIG. 14 is a flow diagram of a straight-edge detection method according to an embodiment of pre-processing.

Referring now to FIG. 14, a straight edge detection method 950 according to an embodiment will now be described. As shown by the flow diagram of FIG. 14, the method comprises the steps of: (step 9100) preprocessing the digital image to reduce its resolution and smooth noise, (step 9110) calculating a gradient value or a change value of each pixel with respect to it's surroundings (i.e. neighboring pixels); (step 9120) determining images profiles of the gradient values based on the relative location of similar gradient values; (step 9130) determining a optimal binarization threshold value based on the results of the gradient values and the linearity of image profiles; and (step 9140) binarizing the gradient values based on the determined optimal binarization threshold to locate the positions of one or more straight edges in the digital image. Each of the above steps 9100 to 9140 will now be described in more detail.

In step 9100, the original digital image is down sampled to a lower resolution for complexity reduction and noise smoothing. For example, the original image may be down sampled to 10 percent (%) of its original image, but, of course, the original image may be down sampled by any suitable amount to a resolution less than its original resolution. For the purposes of this example, an original image having a resolution of 300×300 dots per inch (dpi) is down sampled to a lower resolution image having a resolution of 100×100 dpi using an anti aliasing filter and Gaussian smoothing.

Next, in step 9110, the down sampled image is processed with a Sobel edge detector to track the change of each pixel with respect to its surrounding pixels. This produces a gradient image of the down sampled image, wherein the pixel value of each pixel of the down sampled image is replaced with a gradient value (or change value) representing the change of the pixel with respect to its surrounding pixels.

The method then continues by processing the change values for each pixel as obtained by the Sobel edge detector using the concept of margin profiles to determine an optimal binarization threshold that guarantees the visibility of the page edge (steps 9120 and 9130). Here, this achieved by optimizing a linearity criterion for the margin profile(s).

In step 9120, a linearity of image profiles of the down sampled gradient image is determined for a range of binarization values. In other words, for each binarization value in a range of binarization values, an image profile of the down sampled gradient image is determined. Experiments have shown binarization values in the range from 0 to 20, with a step size of 1, may be adequate, but this range of values can be different and can even be dynamically determined for each image based on image features or results of previous image profile determinations.

Determination of an image profile for each binarization value in a range of binarization values may be repeated with respect to different sides of the gradient image. In this way, a range of image profiles may be determined with respect to one side of the gradient image, and one or more further ranges of image profiles may be determined for one or more other remaining sides of the gradient image.

Choosing an appropriate optimal binarization threshold value can have important implications for ensuring accurate edge detection.

Turning to FIGS. 15, 16a, 16b and 16c, it can be seen how the value determined for the optimal binarization threshold value can affect the result of a straight edge detection method according to an embodiment.

FIG. 15 shows an original digital image of a dark document having a dark background. FIG. 6a shows a binarized version of the digital image of FIG. 15 using an optimal binarization threshold value. FIG. 16b shows a binarized version of the gradient image of the digital image of FIG. 15 using a lower binarization threshold value than that of FIG. 16a. FIG. 16c shows a binarized version of the digital image of FIG. 15 using a higher binarization threshold value than that of FIG. 16a.

From FIGS. 16a to 16c is can be seen that use of an optimal binarization value produces a binarized image having well-defined edges, whereas use of a binarization value which is too low or too high, produces a binarized image containing lots of noise or little content, respectively.

As mentioned above, determination of the optimal binarization threshold value may be based on optimizing a linearity criterion for the determined margin profiles. As a linearity measure one can use the criteria that when a line is linear, the standard deviation of the intercepts at equidistant points from their mean value is a minimum. For example, for the top side (TS) margin, one obtains the y- or row-intercepts of points that are five pixels apart along the x-direction or columns. The mean of the y-intercepts is computed by averaging the y-intercepts. The linearity measure is the sum of squared errors of the difference of the individual y-intercepts from the mean y-intercept. The more linear the line, the less is the sum of the squared errors. The same method as above for calculating a linearity measure is used for the bottom side margin. For the left and the right side margin, one obtains the x- or column-intercepts of points that are five pixels apart along the y-direction or rows. The mean of the x-intercepts is computed by averaging the x-intercepts. The linearity measure is calculated as the sum of squared errors of the difference of the individual x-intercepts from the mean x-intercept.

Figure 17:
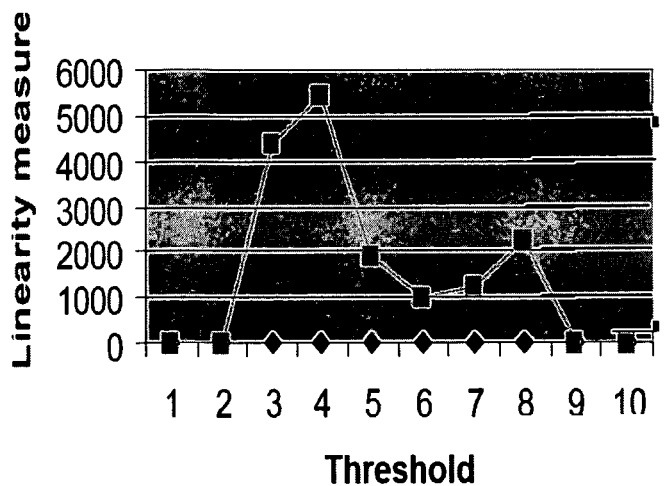
FIG. 17 is an exemplary graph of a linearity measure of margin profiles against the corresponding binarization value used to create each margin profile.

Turning to FIG. 17, a plot of the linearity measure of margin profiles against the corresponding binarization value is used to determine the optimal threshold at which the gradient image has to be binarized in order to detect a straight edge. It has to be noted, that for this plot (as based on the criteria mentioned above), a lower value of the linearity measure indicates that the points are more linear and a higher value indicates that the points are less linear. As has been seen from FIG. 16b, scan bed noise can lead to long and connected lines which correspond to the first minimum of the linearity measure plot. Thus, initially, the linearity measure vs. quantization plot shows a (first) local minimum (for binarization value "six" (6) in FIG. 17) that corresponds to detecting the scan bed noise. As the binarization threshold value then increases further, the linearity increases to a local maximum before subsequently reaching a (second) local minimum that corresponds to detecting the linearity of the document page edge. Thus, for the plot of FIG. 17, it determined that the value for the optimal binarization threshold is "nine" (9). This value for the optimal binarization threshold ensures that a long connected component or document page edge is visible in the binarized digital image (as illustrated in FIG. 16a).

Thus, from above, it will be appreciated that the step 9130 of determining an optimal binarization threshold value comprises: for each image profile of the gradient image, computing a measure of linearity of gradient values; and selecting a binarization threshold value corresponding to a second minimum in a graph of linearity versus threshold value as the optimal binarization threshold value.

Using the optimal binarization threshold, the gradient image is binarized in step 9140 so as to detect a document page edge in the gradient image. The pixel positions of the detected page edge in the binarized gradient image determine the location of the page edge in the digital image, for example.

The above approach uses only margin profiles determined with respect to one side of the digital image, so as to reduce computational complexity. Where more computational power is available, and/or where a segment-based implementation is not necessary, the margin profiles can be determined with respect to more than one side of the digital image and subsequently used for threshold value optimization.

As both the intensity of the edge detected output and the relative locations of similar pixels are considered for determining an optimal threshold value, the proposed approach can detect document page edges accurately in cases where scan bed noise is absent.

Figure 18:
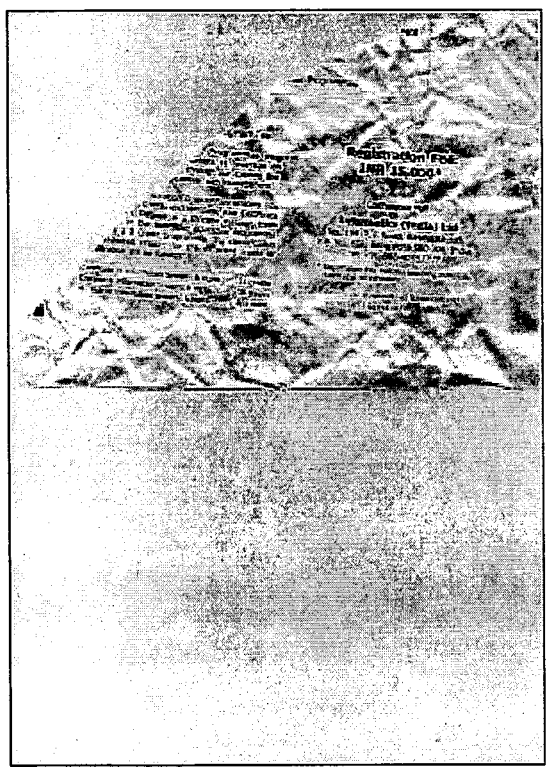
FIG. 18 shows an input digital image obtained by a scanner, wherein the document has a light background scanned and the scanner lid was closed.

For example, when a scan bed of a scanner is closed (i.e. when the scan bed background is light) and a document with light background is scanned, the proposed method is still able to detect the page edge accurately. FIG. 18 shows an input digital image obtained from a document with light background being scanned with the scanner lid closed.

Figure 19:
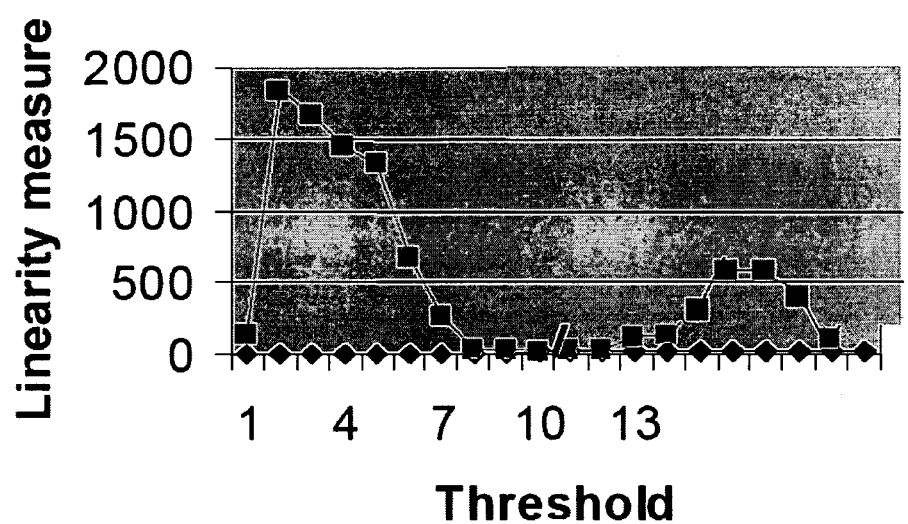
FIG. 19 is another exemplary graph of a linearity measure versus binarization threshold.

Further, FIG. 19 shows the linearity versus threshold plots used to determine the optimal threshold value. As before, it is seen that the optimal threshold value corresponds to a second local minimum of the linearity measure versus threshold plot.

The proposed preprocessing step seeks to enable visibility of the page edge irrespective of document background (i.e. light or dark documents on light or dark backgrounds, respectively), noise, lighting or CCD sensor output variations. This may be due to the following reasons:

- The proposed marginal profile based adaptive binarization may increase the likelihood of the visibility of document edges, as both the intensity of the edge detected output and the relative location of similar pixels are considered for selecting the appropriate binarization threshold. This would not have been possible with histogram-based threshold choice.
- As the threshold selection depends on each document image and scanner background combination, device-dependent tuning may be avoided.
- The proposed approach may be of low complexity as the appropriate threshold may be chosen by only one pass of the edge-detected output. Furthermore, for each threshold, along each of the margins, the location where the pixel value just exceeds the threshold may be stored. This position can then be used to start the scan for the next threshold. At the appropriate threshold, the linearity measure for these pixel locations reaches the second minimum.

In the above description of the pre-processing steps, it is noted that, even if the adaptive threshold, does not enable a page edge for a given document to be successfully detected, the approach may still be able to optimize the threshold for detection of content boundary edges, in the same way.

An example method suitable for rotating an image in segments (swaths) will now be described in greater detail.

The relationship between given input swaths and given output swaths depends on many factors, including the size of the swaths and the angle of rotation. Thus, although it is not necessary to wait for accumulation of the full input image, the rotational transformation dictates that there will not be a one-to one relationship between input and output swaths. The swath-based approach to image rotation therefore requires a small number of input swaths to be buffered in memory until sufficient image data are available to compute an output (rotated) swath. In general—and particularly if the output and input swaths are to have the same number of rows—more than one input swath will be needed to generate any given output swath. The presently described methods allow the optimal number of input swaths (and thus minimal amount of memory) to be precalculated, depending on the angle of rotation. At the same time, the proposed buffering scheme ensures that no distortion of the image or reduction in quality occurs. In particular, the buffering scheme ensures that no blocking artifacts are introduced in the region of the boundaries between swaths.

In one embodiment, a three-shear based rotation is adapted to be amenable to swath-based input/output. A theoretically optimal memory requirement for swath-based image rotation is determined. Image rotation is then implemented using this optimally-sized memory, using a circular buffer. The time complexity of the proposed algorithm is comparable to that of the three-shear based approach.

Figure 20:
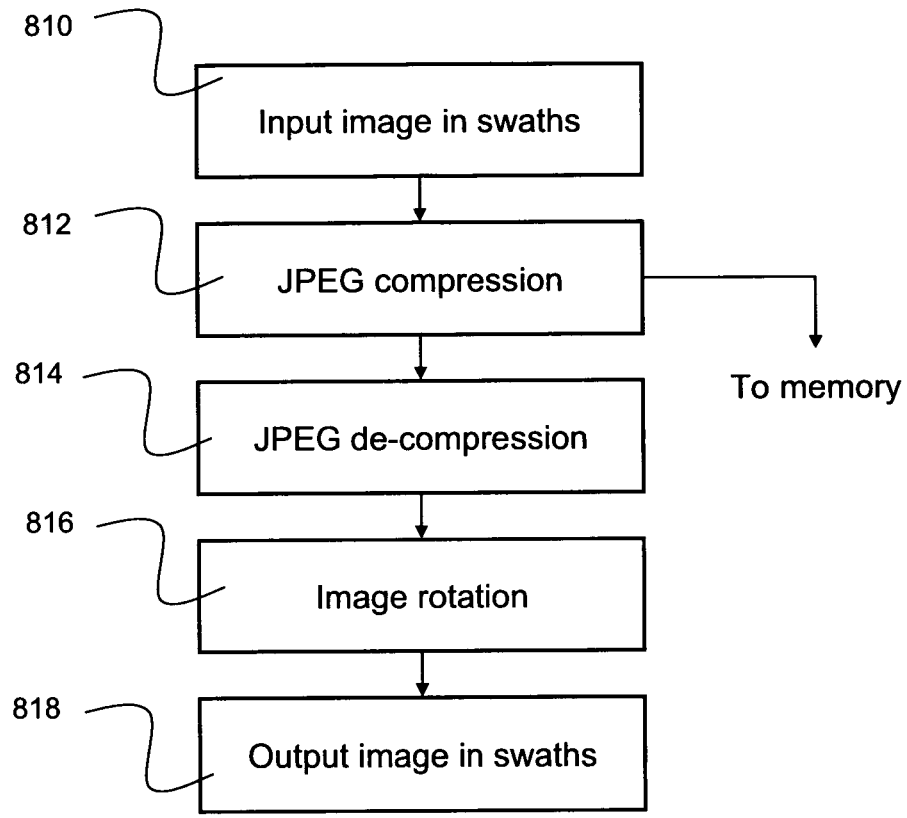
FIG. 20 shows a typical pipeline of operations in an ADF scanner.

FIG. 20 shows a scanner pipeline where the document image is input and/or output in swaths of 32 or 64 rows. As a document is scanned, in step 810, an image is input in horizontal swaths, each swath consisting of a contiguous set of rows. JPEG compression may be carried out next, in step 812. If the incoming swaths have been JPEG compressed, they will be de-compressed (step 814) before skew correction. The skew correction process comprises estimation of the angle of skew (as described previously above) and rotation of the image by the corresponding angle in the opposite direction (step 816). Finally, the image is output, for example to a printer print-head, in step 818.

Pre-storing the entire image in memory before rotation 816 is time consuming and memory inefficient. Instead, a theoretically optimal memory requirement for this scenario will be computed based on the skew angle, allowing an efficient adaptation of the shear-based algorithm using a circular buffer to rotate the image using minimal memory.

Firstly, a general overview of 3-shear based rotation will be given.

Rotation is the most sophisticated affine transformation. When the original coordinates (u, v) and the rotation angle θ are provided the new coordinates (x, y) of the point being rotated are given by:

$$\begin{bmatrix} x \\ y \end{bmatrix} = \begin{bmatrix} \cos\theta & -\sin\theta \\ \sin\theta & \cos\theta \end{bmatrix} \begin{bmatrix} u \\ v \end{bmatrix}$$

Figure 21:
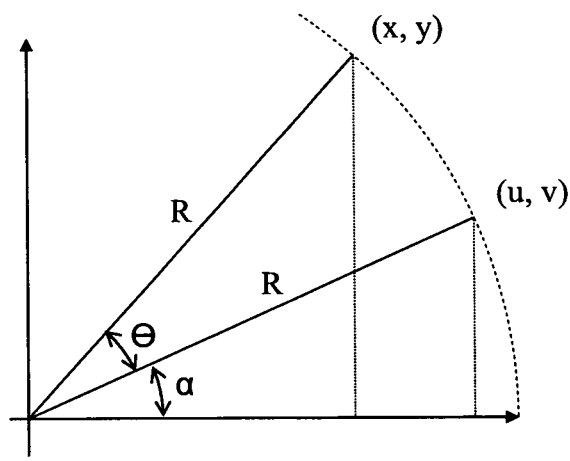
FIG. 21 illustrates the derivation of a matrix-multiplication representation of rotation.

This can be deduced from FIG. 21 where it can be seen that:

$\cos \alpha = u/R,$ $\sin \alpha = v/R,$ $\cos(\alpha+\theta) = x/R = \cos \alpha \cos \theta - \sin \alpha \sin \theta,$ and $\sin(\alpha+\theta) = y/R = \sin \alpha \cos \theta + \cos \alpha \sin \theta.$ So:

$x = u \cos \theta - v \sin \theta,$ and $y = u \sin \theta + v \cos \theta.$

Figure 22:
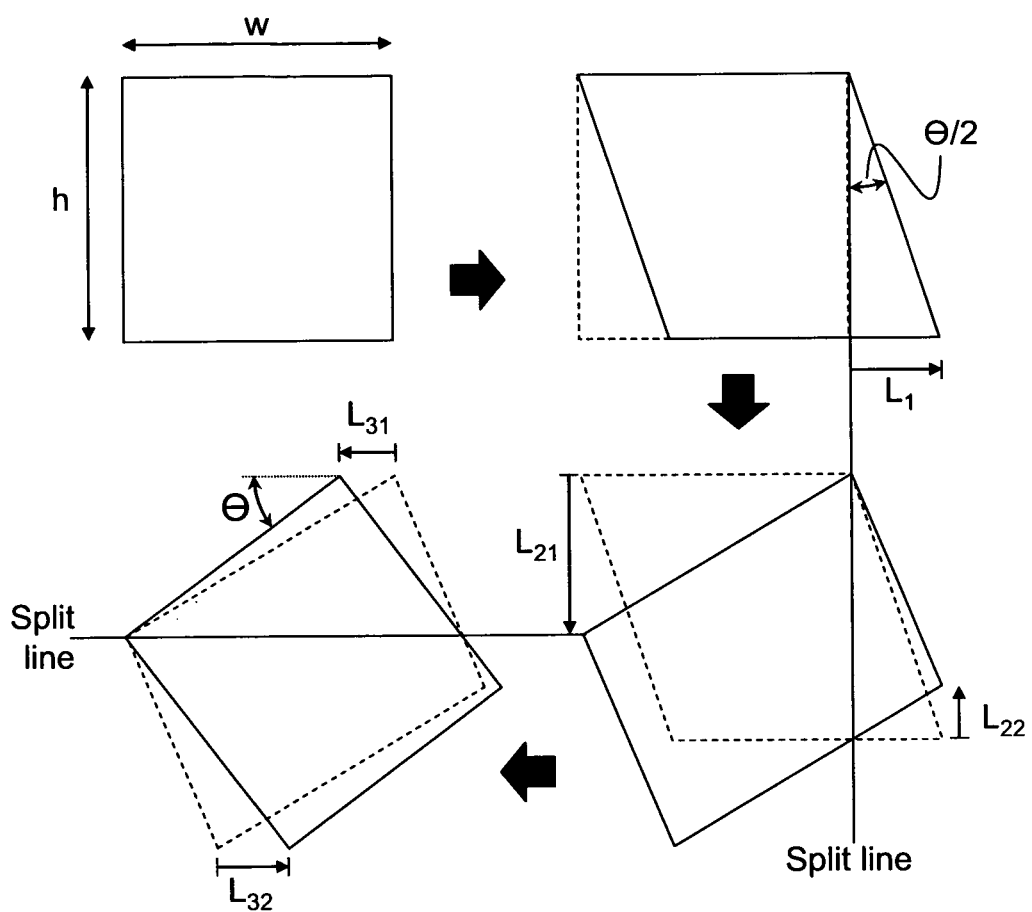
FIG. 22 shows how a rotation transformation can be composed from three shear transformations.

An identical transformation can be achieved by decomposing the rotation matrix into several passes, with each pass performing certain amount of horizontal shearing or vertical shearing as depicted in FIG. 22. The rotation matrix is decomposed into 3 matrices as follows:

$$\begin{bmatrix} \cos\theta & -\sin\theta \\ \sin\theta & \cos\theta \end{bmatrix} = \begin{bmatrix} 1 & -\tan\frac{\theta}{2} \\ 0 & 1 \end{bmatrix} \begin{bmatrix} 1 & 0 \\ \sin\theta & 1 \end{bmatrix} \begin{bmatrix} 1 & -\tan\frac{\theta}{2} \\ 0 & 1 \end{bmatrix}$$

In FIG. 22, the input to each shear operation is depicted by dashed lines and the output of each shear by solid lines. The output of one phase forms the input to the next phase.

The total shearing amount for the first pass is L1=h tan(θ/2), where h is the image height. The operation involved in this pass is shifting each row horizontally to the right. The shift amount increases linearly from 0 to L1 while rows are processed from top to bottom. The first shear results in a parallelogram shape, as shown in the top-right corner of FIG. 22.

For the second pass, there are different total shear amounts and directions for columns of pixels on either side of a split line. The split line thus marks a vertical line, which is not shifted by the vertical shear operation. To the left of the split line, the shear is downward by a total of L21=w sin(θ). To the right of the split line, the shear is L22=h (1−cos(θ)) upward. Here w is image width.

The split line is a convenient reference point of zero translation. Alternatively another reference could equally be chosen. For example, the zero-shift reference could lie at the left (top-left corner) of the parallelogram. In this case, the total shear (upward) would be L22−L21.

For the third pass, taking a horizontal split line through the upper left corner of the transformed shape as the reference, there are again different total shear amounts and directions for blocks above the split line and beneath the split line. These are L31=w(1−cos(θ)) to the left, and L32=h (sin(θ)−tan(θ/2)), to the right, respectively.

Figure 23:
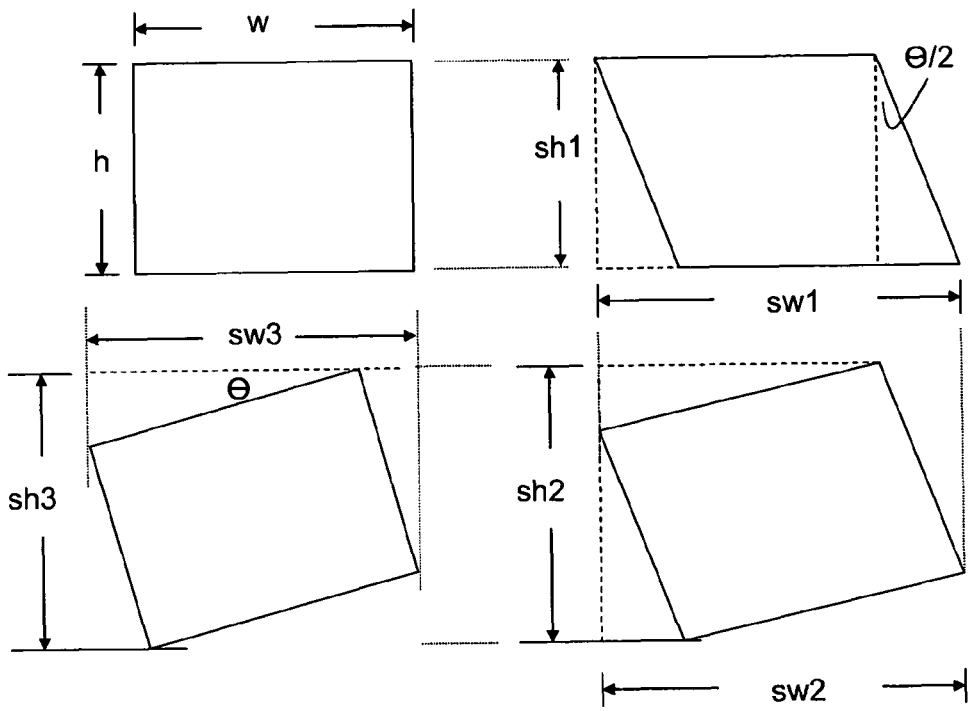
FIG. 23 shows the dimensions of the image after the first, second and third shears.

From the above discussion and as illustrated in FIG. 23, the dimensions of the image after each shear are:

$$sw1 = shear1\_width$$
$$= image\_width + image\_height * abs(tan(\Theta/2))$$
$$sh1 = shear1\_height = image\_height$$
$$sw2 = shear2\_width = sw1 = shear1\_width$$
$$sh2 = shear2\_total\_height$$
$$= image\_width * abs(sin(\Theta)) + image\_height * cos(\Theta) + 1$$
$$sw3 = shear3\_total\_width$$
$$= image\_height * abs(sin(\Theta)) + image\_width * cos(\Theta) + 1$$
$$sh3 = shear3\_height = shear2\_height$$

Based on the above discussion, the pseudo code for the three-shear rotation is as follows:

```
for input image do       // Begin image
  for each row do        // Begin horizontal shear
    Calculate offset as image_width + row_number*abs(tan(Θ/2));
    Fill pixels up to offset with background color;
    Bilinearly interpolate two adjacent pixels and place it in the new
location until image_width is reached;
    Fill remaining pixels up to new width (sw1) with background color;
  end                    // End horizontal shear
  for each column do     // Begin vertical shear
    Calculate offset as column_number*abs(sin(Θ)) +
image_height*cos(Θ) + 1;
    Fill pixels up to offset with background color;
    Bilinearly interpolate two adjacent pixels and place it in the new
location until image_height is reached;
    Fill remaining pixels up to new height (sh2) with background color;
  end                    // End vertical shear
  for each row do        // Begin horizontal shear
    Calculate offset as row_number*abs(sin(Θ)) +
image_width*cos(Θ) + 1;
    Fill pixels up to offset with background color;
    Bilinearly interpolate two adjacent pixels and place it in the new
location until image_width is reached;
    Fill remaining pixels up to new width (shear3_total_width) with
background color;
  end                    // End horizontal shear
end                      // End image
```

The use of bilinear interpolation is one of a number of interpolation options and represents a compromise between simplicity and output image quality. Other techniques for interpolation (re-sampling) in one dimension will be well known to those skilled in the art of image processing. For example, various kinds of kernel-based interpolation may be used, which will take a larger number of input pixels into account when calculating the value of an output pixel. This can increase the accuracy of the output, at the expense of additional computation. Simpler interpolation techniques, such as nearest neighbor interpolation, are also possible if computational complexity must be minimized.

Image rotation can start as soon as a satisfactory skew angle is detected (see above). In AiOs/MFPs (All-in-One/Multi-Function Printers), the document image can also be printed swath-by-swath based on the size of the print head. Therefore, if the output image after skew correction is formed in swaths, the printing can start immediately as soon as the first swath is ready. This can reduce the waiting time for the user and can optimize the memory requirement, thereby enabling an efficient embedded implementation. However, adaptation is necessary to the basic three-shear rotation algorithm to be amenable for such swath-based input/output.

Figure 24:
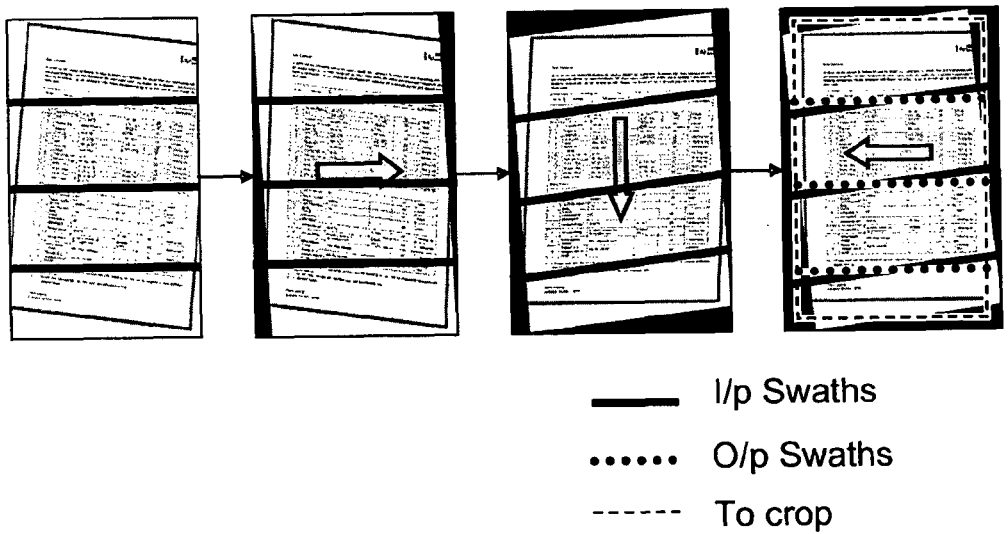
FIG. 24 illustrates how an image is processed according to a three-shear swath-based approach according to an embodiment.

This adaptation of the three-shear based image rotation for swath-based input and output will now be described. The fundamental design constraint is that enough input swaths need to be buffered so that the output swaths will be properly generated. FIG. 24 shows how this condition is met, in practice. FIG. 24 shows how a skewed input document in swaths is rotated using a swath-based approach. Each image shown is displayed as it might be stored in memory at each stage of the processing (assuming that the image is raster-scanned in row order). At the left of the drawing is the input image. Input swaths are shown divided by solid lines. The shears (horizontal, vertical and horizontal) are applied successively from left to right. At the far-right of the drawing, the final output is shown. Output swaths are shown divided with round-dotted lines. The truncation at the boundary of the image (to crop the rotated output image to the same size as the input) is shown by the dashed rectangle. Comparison of the extent of the input and output swaths reveals that the first output swath overlaps both the first and second input swaths. That is, parts of the first and second input swaths are required in order to generate the first output swath. For swath-based processing, this means that both the first and second input swaths must be received and rotated before the first output is delivered. Buffering of a sufficient number of input swaths competes with the desire to produce output as quickly as possible and to use as little memory as possible.

Figure 25:
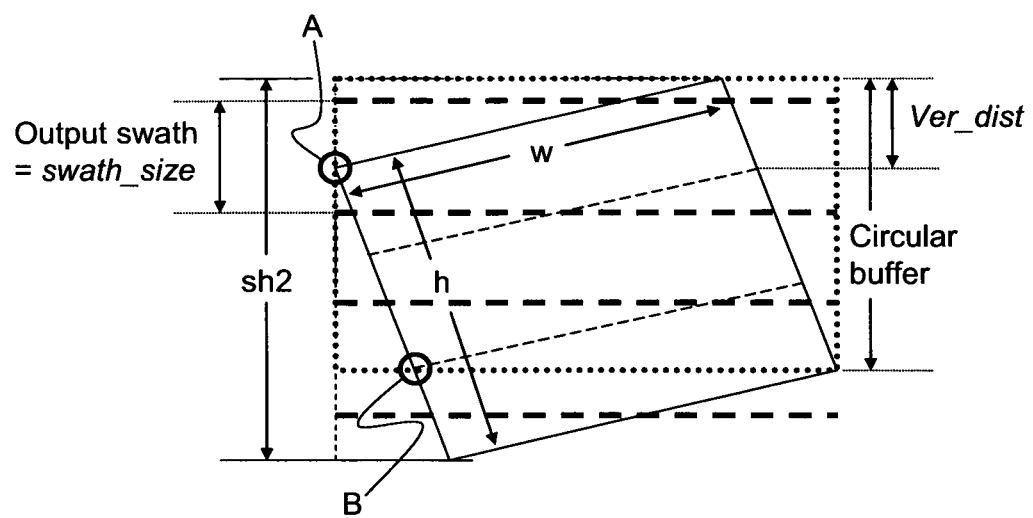
FIG. 25 shows how the result of the second vertical shear is stored in memory for swath-based input and output.

FIG. 25 illustrates the derivation of the optimal (minimal) number of swaths that need to be buffered. In FIG. 25, the outline of the input image (solid line rectangle) is drawn as it appears after the second vertical shear. The input swaths/segments comprising the input image (light dashed lines) are also shown. This shows how the rows of the buffer/memory (dotted line rectangle) correspond to the image content of the input image/swaths after the second vertical shear. The output swaths in the buffer are drawn as heavy dashed lines. The height of the output swaths at this stage is the same as that of the final output swaths, because the final (third, horizontal) shear transformation will only operate on individual rows in isolation, shifting them horizontally relative to one another.

Note that the start of the first output swath does not coincide with the top of the rotated input image, because of cropping (considered in greater detail below). Note also that the calculated minimum memory requirement is independent of the means of rotation. Thus, the method is not limited to rotation based on a plurality of shears. That is, swath-based image rotation can be implemented in any way, and the minimum memory requirement will remain the same.

As can be seen from FIG. 25, the first output swath requires input from the first and second input swaths. That is, the first output swath cannot be generated until the first and second input swaths are ready. Vertex A is the transformed position of the top-left corner of the input image and the start of the first swath. Vertex B is the bottom-left corner of the second input swath—that is, vertex B corresponds to the start of the last row of the second input swath. The position of A, together with the vertical distance from A to B, determines the size of the buffer. This will depend on the angle of rotation, theta.

In the current embodiment there is an additional requirement that the output image dimensions should be equal to the input to enable documents to be printed in the same sizes as they are scanned. In this case, it is necessary to crop the image after the last shear so that the cropped image size is equal to the input image size. That is, initially rows_to_crop number of rows will not be output anyway, as they would be cropped, where rows_to_crop=(shear3_height−image_height)/2. These rows need not be generated at all. For a proper output swath, swath_size rows need to be ready after rows_to_crop. If x swaths are to be buffered before the first output swath is ready, then from FIG. 25, it can be seen that:

$$x * \text{Ver\_dist} >= \text{swath\_size} \qquad (1)$$

Ver_dist is the difference in rows of the top-left corners of two successive swaths after the second (vertical) shear. Equivalently, it is the number of valid rows that can be filled with data after processing a single input swath.

$$\begin{aligned}\text{Ver\_dist} = &\{\text{image\_width} * \text{abs}(\sin(\theta)) + (x+1) * \\ &\text{swath\_size} * \cos(\theta) + 1\} - \\ &\{\text{image\_width} * \text{abs}(\sin(\theta)) + \\ &x * \text{swath\_size} * \cos(\theta) + 1\} \\ = &\text{swath\_size} * \cos(\theta)\end{aligned} \qquad (2)$$

So, the minimum, number of input swaths that are to be buffered for the first proper output swath is, ceil(1/cos(θ)). Here, ceil denotes the ceiling function. In order to store these input swaths, a circular buffer is used so as to optimize the reuse of memory. The circular buffer size and minimum memory required to buffer the second vertical shear output is:

$$\text{image\_width} * \text{abs}(\sin(\theta)) + (\text{ceil}(1/\cos(\theta))) * \\ \text{swath\_size} * \cos(\theta) + 1 \qquad (3)$$

The intermediate memory required is implemented as a circular buffer, whose size was computed as described above. The idea is that, once an output swath is dispatched (for example to the print-head to be printed) the next processed input swaths can be overwritten in the same memory space in a circular fashion. So, the first horizontal shear and the second vertical shear are processed for each input swath. The result of the first horizontal shear can be stored in a single buffer whose height is equal to the swath size, and whose width is equal to (image_width+swath_size*tan(θ/2)). The output of the second vertical shear is stored in the optimal memory buffer. After these two operations, the row number is checked to see if enough image data are available to produce the first output swath (see also the pseudo-code below). If not, the first and the second steps are repeated for the next input swath, until it becomes possible to produce an output swath. Then, when the first output swath is ready, the third horizontal shear is performed on the output swath, and the corresponding rows are overwritten on the buffer by the next input swath. The above steps are performed sequentially, until all the input swaths have been rotated properly. The pseudo-code for the algorithm is as follows:

```
Allocate memory for circular buffer capable of storing minimum number
  of swaths
Reset flag_first_output_ready = 0
for each input swath do
    Increment input swath number;
Perform horizontal shear of swath;
Perform vertical shear of swath and store result in circular buffer;
if (the minimum number of rows filled in circular buffer >=
  rows_to_crop +swath_size) &&
  (flag_first_output_ready = 0) do
  /* Indicate that enough rows are available to generate the first output
  swath */
        flag_first_output_ready = 1;
end
if flag_first_output_ready == 1 do
    Perform third horizontal shear of the output swath;
    Output swath;
    Increment output swath number;
end
end
for output swath number <= input swath number do
    Perform third horizontal shear of the output swath;
    Output swath;
    Increment output swath number;
end
```

As described above, the run-time memory requirement of this algorithm depends on the image width, and the degree of skew. For example, consider the memory requirement for rotating a 2550×3300 image: storing the whole uncompressed (16-bit) image in memory would require 16 MB; according to the current embodiment, the corresponding memory requirement varies between 0.2 MB and 5 MB for rotation angles of 0 to 15 degrees.

The run-time memory requirement of the algorithm is therefore much less than that of the traditional three-shear algorithm—in particular, for smaller rotation angles. The algorithm is also realized without any significant computational overhead.

In the example described above, an additional requirement was imposed that the output image and input image be of the same size. This will be appropriate in many applications. However, it will inevitably result in cropping of some portions of the rotated image. As an alternative, if it is desired to retain all image information, a larger output image can be generated. This can easily be achieved, for example, by padding the input image with an appropriate number of background pixels.

The embodiments discussed above have focused on images which are delivered or stored row-wise. In this case, the implementation of the shear in the order row-column-row (that is, horizontal-vertical-horizontal) will be most efficient, since it is often more efficient to access memory sequentially and this will occur for the two row (horizontal) shears. Of course, the three shears can equally be implemented in the order column-row-column.

Embodiments are not limited to the implementation of rotation by shear transformations. Provided the input image is available in swaths, the rotation can be applied to these swaths in any suitable way. Various approaches to image rotation are well-known in the prior art. Different methods will have different advantages in different applications, as will be apparent to one skilled in the art. Any image rotation algorithm can be adapted, in the manner described above, to implement a swath-based rotation method.

Embodiments of the methods and systems described above may offer computationally lightweight skew detection, such that the algorithms may be performed in real-time in an embedded platform. The approaches may offer robustness to noise, such that skew may be estimated accurately, even in the presence of noise. The techniques described do not need to depend on script specific features to estimate the skew; on the contrary, they may be script independent. Embodiments use a combination of orientation of content in a document, content boundaries and paper edges in order to estimate the skew angle for a document.

In embodiments, each algorithm provides a confidence measure for the skew angle it estimates. This may enable a reduction in computational effort—if one algorithm is confident of success, there may be no need to perform further skew estimation. Similarly, at the end of the combined pipeline of algorithms, if there is low confidence in the (or each candidate) estimate, the system may have the self-awareness to know that no skew correction should be performed. That is, the document should not be rotated, but should be left as it was scanned (or otherwise received).

While specific embodiments have been described herein for purposes of illustration, various other modifications will be apparent to a person skilled in the art and may be made without departing from the scope of the invention.

For example, many of the methods described are equally appropriate when applied to binary image data or binary image-edge data.

Other ways of combining multiple estimates skew-angle can also be imagined. Similarly, confidence measures in these skew-angles other than those described could be derived.

In some embodiments, the apparatus includes a switch, button, or other form of user-interface. This may enable the skew detection and/or correction functions to be user-selectable. Thus, a user could activate and deactivate the skew detection or correction functions, as and when desired. For example, a user could deactivate a skew-detection/correction function when it is desired to deliberately rotate a document to be scanned.

Reference to a processor also comprises reference to two or more independent processors.

Methods and algorithms described herein may be implemented as software instructions for programmable hardware devices such as a microprocessor. These and any other software components of the system are stored in respective storage devices, which are implemented as one or more computer-readable or computer usable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

The invention claimed is:

1. A skew detection apparatus, the apparatus comprising:
an input to receive an image of a document; and
a processor to,
for each of a plurality of sides of the image:
determine locations of a set of foreground pixels or a set of edge pixels of the document that are nearest to the side of the image;
generate from said set of pixels an estimate of a probability distribution of values of an angle of a line joining two pixels of a subset of pairs of pixels chosen from among all possible pairs of pixels from the set, wherein a distance between the pixels in each pair of the chosen subset of pairs of pixels is predefined; and
determine the angle corresponding to a maximum value of a plurality of values in the estimated probability distribution,
produce a first estimated skew angle by combining said angles determined for each of the plurality of sides of the image, and
estimate a first confidence value for the first estimated skew angle.

2. The skew detection apparatus of claim 1, wherein the processor is further to:
calculate a confidence value for each angle;
combine said angles by clustering them into one or more groups;
calculate a group confidence value for each group based on a sum of the confidence values of the angles in that group;
select the group having the highest group confidence value;
produce the first estimated skew angle based on the angles in that selected group; and
estimate the first confidence value for the first estimated skew angle based on a comparison between the highest confidence value and the second highest group confidence value.

3. The skew detection apparatus of claim 1, wherein the chosen subset of pairs of pixels is chosen based on a predetermined number of pixels closest to each pixel in the set, ignoring pixels that are closer than a predetermined threshold distance.

4. The skew detection apparatus of claim 1, wherein in response to a determination that the first confidence value is below a threshold, the processor is to:
detect, within each of one or more vertical slabs in the image and for each of a plurality of angles, a set of straight lines at each angle and containing no foreground pixels;
calculate, for each angle, a measure of area of the respective set of straight lines within each of the vertical slabs;
produce a second estimated skew angle corresponding to a largest calculated measure of area; and
estimate a second confidence value for the second estimated skew angle.

5. The skew detection apparatus of claim 4, wherein in response to a determination that the second confidence value is below a threshold, the processor is to:
compare the second estimated skew angle with the plurality of angles determined for each of the plurality of sides of the image;
determine whether at least one of the plurality of angles is consistent with the second estimated skew angle; and in response to a determination that at least one of the plurality of angles is consistent with the second estimated skew angle, output the second estimated skew angle.

6. The skew detection apparatus of claim 1, wherein the processor is further to:
generate a gradient image from the received image;
choose an optimal threshold for encoding the gradient image; and
use the optimal threshold to determine the locations of the set of edge pixels of the document that are nearest to the side of the image,
wherein the optimal threshold maximizes a measure of straightness of said set of edge pixels.

7. The skew detection apparatus of claim 1,
wherein the image of the document is received in segments, each segment of the segments comprising a strip of the imaged document, the strip comprising a plurality of rows of pixels,
wherein the first estimated skew angle and the estimate of the first confidence value for the first estimated skew angle are based on a first segment of the segments, and
wherein the processor is to begin to correct a skew of the first segment based on the first estimated skew angle before a second segment is received.

8. The image processing apparatus, of claim 7, wherein the segments extend transversely to a feeding direction of the document.

\* \* \* \* \*